Figures 1, 2:
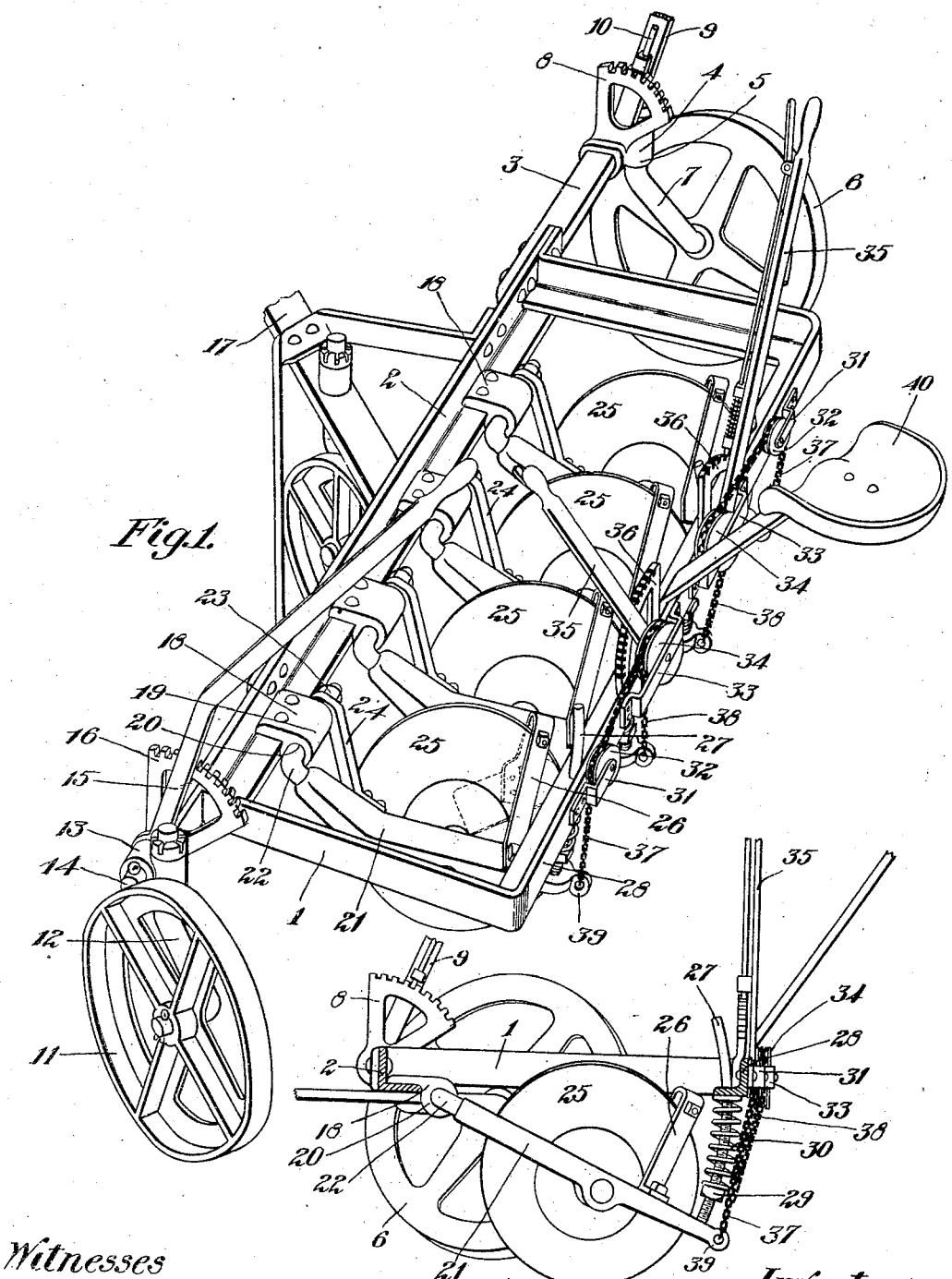

J. B. DONALD.
DISK PLOW.
APPLICATION FILED AUG. 23, 1910.

990,641.

Patented Apr. 25, 1911.

Witnesses

Inventor
J. B. Donald

UNITED STATES PATENT OFFICE.

JOHN BROWNLEE DONALD, OF WINDSOR, ONTARIO, CANADA.

DISK PLOW.

990,641. Specification of Letters Patent. Patented Apr. 25, 1911.

Application filed August 23, 1910. Serial No. 578,548.

*To all whom it may concern:*

Be it known that I, JOHN BROWNLEE DONALD, a subject of the King of Great Britain, and resident of the city of Windsor, county of Essex, Province of Ontario, in the Dominion of Canada, have invented certain new and useful Improvements in Disk Plows; and I do hereby declare that the following is a full, clear, and exact description of the same.

The invention relates to improvements in disk plows, as described in the following specification and illustrated in the accompanying drawings that form part of the same.

The invention consists essentially in the novel construction and arrangement of parts, whereby the disks are carried by individual plow beams pivotally connected to a rigid frame, and whereby said plow beams are raised and lowered at their outer or rear ends.

The object of the invention is, to devise a gang disk plow which will lend itself readily to adjustment for varied conditions of ground, and of simple, strong and durable construction.

In the drawings, Figure 1 is a perspective view of a light gang disk plow constructed in accordance with my invention. Fig. 2 is a sectional elevational view.

Like numerals of reference indicate corresponding parts in each figure.

Referring to the drawings, 1 is the frame of the plow having the heavy front angle bar 2 arranged with its bottom flange turned inwardly and the ends projecting beyond the ends of the frame.

3 is a rigid extension from one end of the front bar 2 having the bracket 4 journaled on its outer end, said bracket being formed with a vertical journal bearing 5.

6 is the furrow wheel journaled upon the axle 7 secured at its upper end in the journal bearing 5.

8 is a quadrant rigidly secured to the extension 3.

9 is a quadrant lever rigidly secured to the journal 4 and having the spring dog 10 to engage said quadrant and hold the lever and axle 7 of the furrow wheel in various adjusted positions.

11 is the land wheel journaled upon an axle 12 carried by a rotatable bracket 13 journaled upon a rigid extension 14 from the opposite end of the front bar 2, said bracket 13 having a lever 15 rigidly secured thereto and coöperating with a quadrant 16 rigidly connected to said extension 14.

17 is a pole connection suitably secured and rigidly braced from the front bar 2 to which any suitable form of draft rigging may be attached.

18 are brackets rigidly secured to the horizontal web of the front bar 2 of the frame and having inwardly extending portions 19 formed with horizontal journal bearings 20 therein.

21 are the plow beams having the angularly formed shanks 22 cast in one end thereof and extending into and journaled in the bearings 20 of the brackets 18, said shanks being preferably formed of steel and threaded on their outer ends to receive the nuts 23.

24 are brace members encircling the outer ends of the shanks 22 and abutting the brackets 18 and rigidly secured to the inner sides of the plow beams. The plow beams are thus very firmly supported in pivotal bearings from the frame.

25 are the disks supported in suitable journal bearings from the plow beams.

26 are spring scraper members supported from the plow beams and engaging the disks.

27 are arc-shaped rods fixedly secured in the outer ends of the plow beams 21 and extending upwardly through suitable holes in the inner flange of the rear bar 28 of the frame, said rods being suitably threaded adjacent to the plow beams and having the nuts 29 thereon.

30 are spiral compression springs encircling the bars 28 and arranged between the nuts 29 and the underside of the bar 28 and exerting a downward pressure on the plow beams and disks. It will be readily seen that the pressure of the springs 30 may be adjusted as desired by adjusting the nuts 29 upwardly or downwardly on said rods.

31 are brackets secured to the outer sides of the bar 28 of the frame immediately above the outermost plow beams and carrying the grooved rollers 32 immediately above the rearmost ends of said plow beams.

33 are brackets also rigidly secured to the rear bar 28 of the frame arranged above the innermost plow beams and having the grooved rollers 34 journaled therein. The rollers 34 are preferably considerably larger in diameter than the rollers 32.

35 are levers rigidly secured to the rollers 34 and operatively engaging suitable quadrants 36 extending upwardly from the plow beams.

37 and 38 are lengths of chain secured to the eye-shaped outer ends 39 of the plow beams 21 and extending upwardly over the rollers 32 and 34 respectively, said lengths of chain being fixedly connected at their ends to the periphery of the rollers 34 so that on the turning of the rollers 34 on their bearing, the chains will be moved upwardly or downwardly, thus raising or lowering the plow beams.

40 is a seat secured to the rear bar of the frame and arranged so that all the levers 35 are within easy reach of the driver.

In the operation of this plow, the compression springs for holding the plow beams downwardly and pressing the disks into the earth are adjusted to suit the ground that is to be worked, by turning the nuts 29 on the rods 27 to increase or decrease the pressure of the springs 30. The driver then adjusts the land and furrow wheels to give the desired setting and starts his plow into operation. If it is desired to raise the disks to pass over a rocky piece of ground or for any other reason, the driver merely moves the levers 35 to pull upwardly on the chains 37 and 38, thereby swinging the plow beams upwardly upon their pivots so that the disks will clear the ground.

The plow beams are herein shown connected together in gangs of two, operated by one lever but it must be understood that they may be operated by individual levers if so desired or more than two disks may be connected in one gang to be operated by a single lever if it is so desired. The compression springs for holding the disks down to their work may be adjusted as desired but such springs allow the beams to swing upwardly upon their pivots in the event of any one of the disks striking a stone or other obstruction.

A plow such as described is very simple to construct and is easily operated.

The arrangement for adjustment and tension may be varied considerably in detail as also may other points of construction so long as the essential feature of pivoting the plow beam carrying the disk in a horizontal journal bearing is maintained.

What I claim as my invention is:—

1. In a disk plow, a main frame having straight front and rear flanged bars, a plurality of lugs rigidly secured to said front bar and suitably spaced within said frame and having journal orifices therethrough, a plurality of plow beams inwardly turned toward their upper ends and terminating at said upper ends in pivot pins right angularly bent and journaled in said lugs, a plurality of disks journaled in said beams intermediate of the length thereof, threaded arc-shaped posts extending upwardly from the rear portion of said beams through the flange of the rear bar of said frame, nuts threaded on said threaded posts, spiral springs encircling said posts between said nuts and said frame, and means for raising said beams against the pressure of said springs.

2. In a disk plow, a rectangular frame having front and rear flanged bars, a plurality of lugs suitably spaced and secured to said front flanged bar and extending inwardly and having horizontal journal orifices, a plurality of plow beams bent inwardly at the front ends thereof and journaled in said horizontal journal orifices, a plurality of disks journaled intermediate of the length of said plow beams, a plurality of springs arranged between said plow beams and the rear bar of the frame, a plurality of chains secured to the lower ends of said plow beams, a plurality of pulleys suitably journaled and supported by the rear bar of said frame above the said plow respectively, said chains extending over said pulleys in groups and suitably secured, tooth quadrants rigidly secured to the rear bar of said frame concentric with the master pulleys of said groups, levers having spring pawls secured thereto engaging said quadrants and controlling the rotation of said master pulleys and operating said disks in groups.

3. In a disk plow, the combination with a rigid rectangular frame, of a plurality of brackets rigidly secured to the inner side of the front bar of said frame and having horizontal journals therein, plow beams having laterally extending shank portions secured in said bearing brackets, disks rotatably secured to said plow beams, adjustable means for holding said plows downwardly, brackets secured to the rear of said frame and having grooved rollers journaled therein, quadrant levers operatively connected with certain of said rollers and chain lengths secured to the rear ends of said plow beams and extending over said grooved rollers and connected together and adapted to be operated by said quadrant levers.

Signed at the city of Toronto, county of York, Province of Ontario, in the Dominion of Canada, this 13th day of August 1910.

JOHN BROWNLEE DONALD.

Witnesses:
E. HERON,
P. SHEE.

---

Copies of this patent may be obtained for five cents each, by addressing the "Commissioner of Patents, Washington, D. C."